K. YOSHINAGA.
INDICATING AND RECORDING SPEEDOMETER.
APPLICATION FILED JUNE 1, 1920.
1,380,510.
Patented June 7, 1921.
2 SHEETS—SHEET 2.
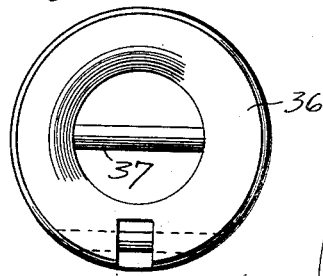
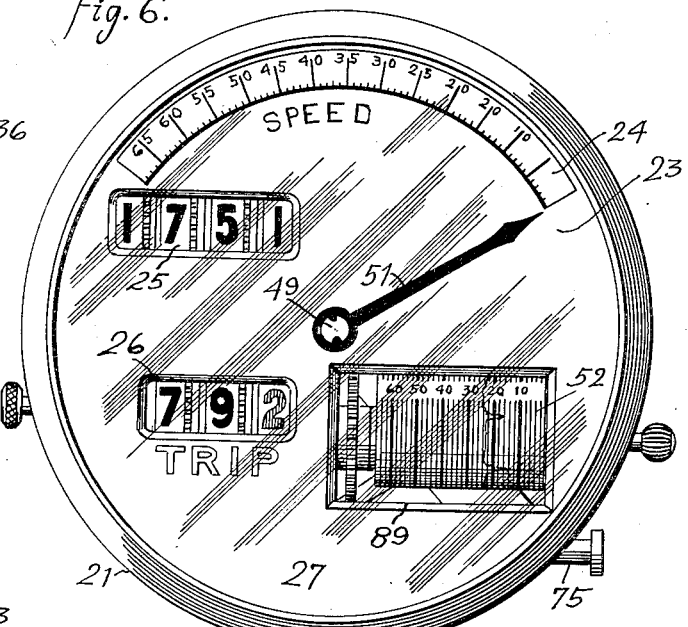
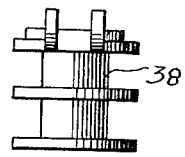
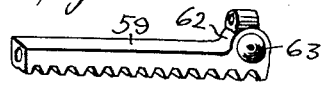
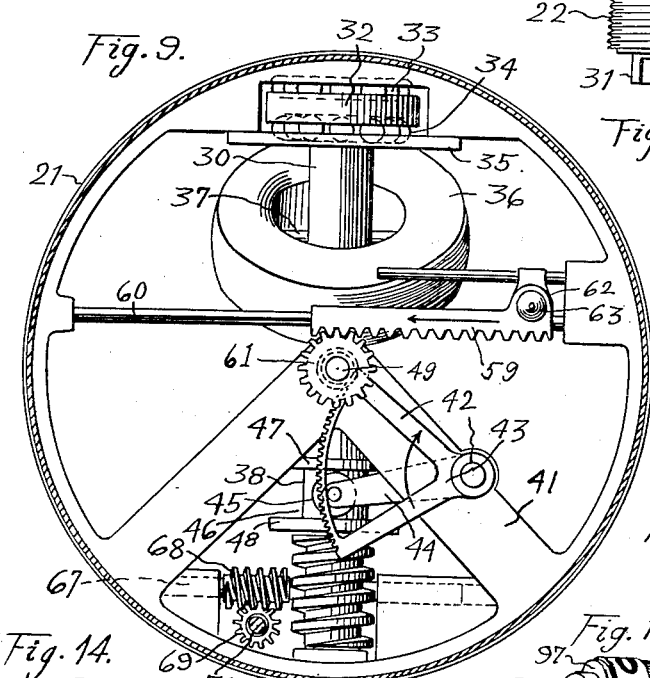
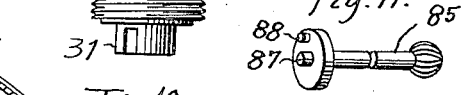
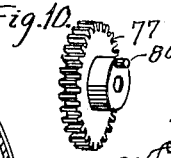
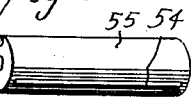
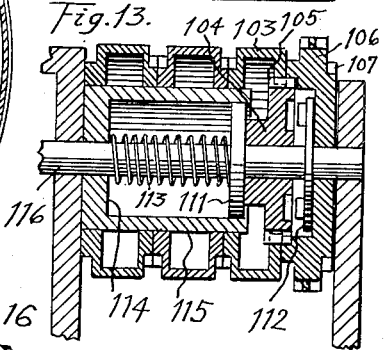
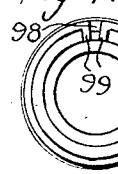
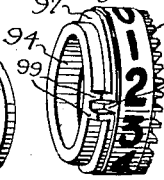
INVENTOR:
Kuzo Yoshinaga.
By Atty.

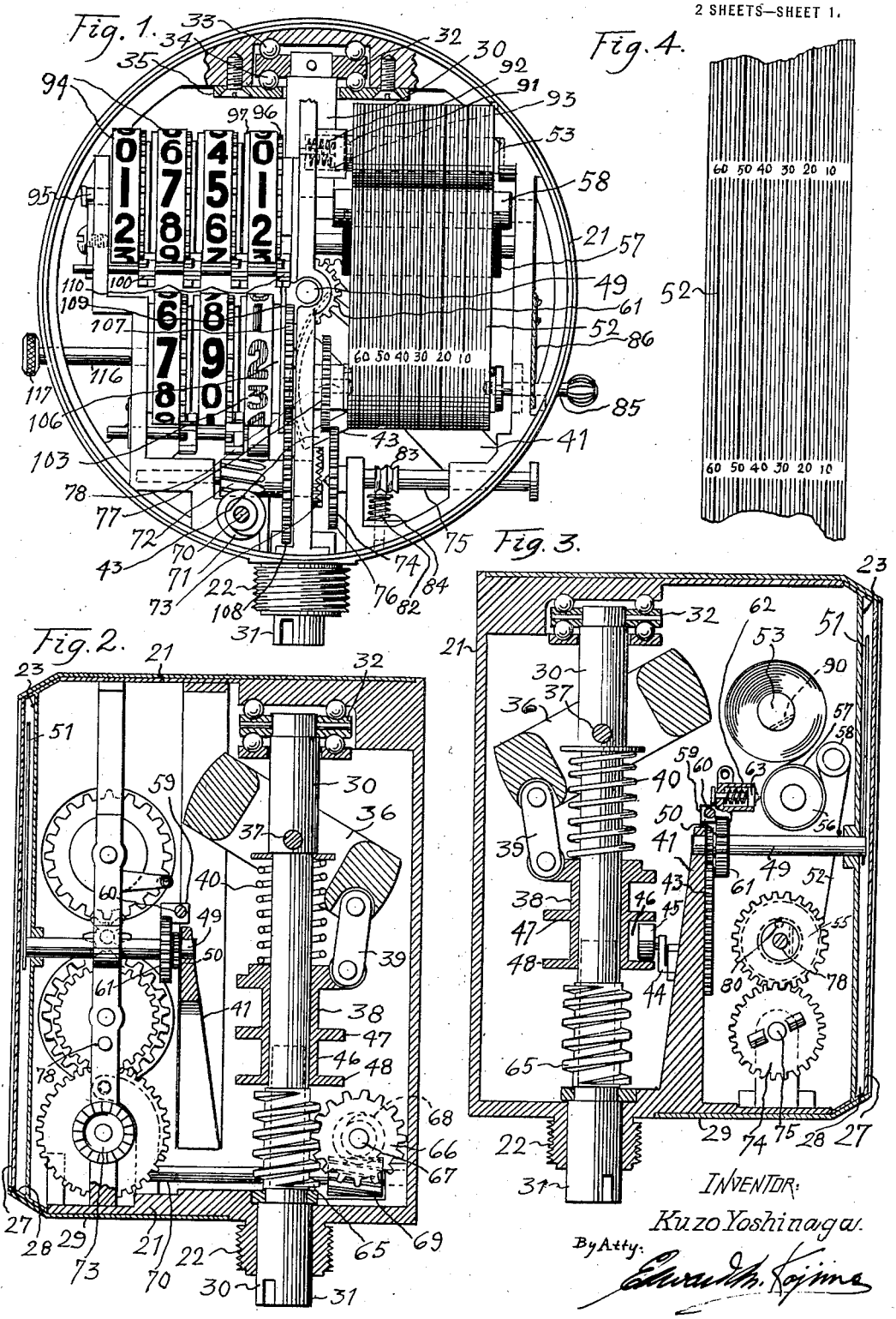

UNITED STATES PATENT OFFICE.

KUZO YOSHINAGA, OF LOS ANGELES, CALIFORNIA.

INDICATING AND RECORDING SPEEDOMETER.

1,380,510.  Specification of Letters Patent.  Patented June 7, 1921.

Application filed June 1, 1920. Serial No. 385,673.

*To all whom it may concern:*

Be it known that I, KUZO YOSHINAGA, a subject of the Emperor of Japan, residing in the city and county of Los Angeles and State of California, have invented a new and useful Indicating and Recording Speedometer, of which the following is a specification.

This invention is an improvement in vehicle speed indicating and recording devices, and has for its objects to provide a speed indicating mechanism adapted to be arranged on the dash of the vehicle to indicate to the driver the speed at which the vehicle is traveling, to record the distance traveled, and to record on a paper fabric web the speed attained during the trip or period that the vehicle has traveled.

Another object of the invention is to provide mechanism wherein the speed recording device is normally held inoperative if desired, and whereby the speed record may be removed at the termination of each individual trip if desired.

This invention includes individual trip speed indicating mechanism, in combination with distance recording mechanism therefor, totalizing mechanism for the distance recording mechanism, and recording mechanism for the speed attained during a trip, and further comprehends a clutch mechanism for releasing the distance recording mechanism from operative position, and clutch mechanism for actuating the speed recording mechanism to operative and inoperative positions.

In the accompanying drawings has been illustrated a simple and preferred form of the invention; it being however understood that no limitation is necessarily made to the precise structural details therein exhibited, but that changes, alterations and modifications within the scope of the invention, may be resorted to when desired.

In the drawings, Figure 1 is a front view of my improved speedometer, with the cover removed, showing the speed recording and indicating mechanism and the distance recording mechanism. Fig. 2 is a vertical mid-sectional view of my device showing the distance recording mechanism. Fig. 3 is a vertical mid-sectional view showing the arrangement of the speed recording mechanism. Fig. 4 is a fragmentary view of the paper fabric web on which the speed attained is recorded. Fig. 5 is a detail plan view of the weight element which actuates the speed indicating and recording mechanism. Fig. 6 is a front elevation of the speed indicating and recording device. Fig. 7 is a detail view of a sliding sleeve which is operated by the weight element to actuate the speed indicating and recording mechanism. Fig. 8 is a perspective view of the rack member which carries the speed recording stylus. Fig. 9 is a vertical and transverse sectional view of the housing showing the speed recording mechanism which actuates the speed recording stylus. Fig. 10 is a perspective detail view of the gear member which actuates the speed recording reel. Fig. 11 is a perspective view of the manually actuated operating shaft for the winding drum or reel on which the speed recording ribbon is wound. Fig. 12 is a perspective view of the ribbon winding drum or reel. Fig. 13 is a fragmentary detail view showing the clutch mechanism for releasing the trip recording members. Fig. 14 is a plan view of a distance recording drum showing the gear device whereby the adjoining rotary drum is actuated. Fig. 15 is a perspective view of a pinion which transmits the rotary movement from one distance recording drum to the adjoining drum. Fig. 16 is a perspective view of a distance recording drum. Fig. 17 is a perspective detail view of the clutch element shown in combination with the recording elements in Fig. 13.

The embodiment of the invention as shown in the drawings, is adapted to be affixed to the dash of a motor vehicle, and to be driven by suitable mechanism (not shown) connected to the front wheel of the vehicle, the same as an ordinary speedometer, of which there are many in use. The said embodiment consists of a casing 21, provided on the bottom with a threaded extension 22, for connection with a conduit (not shown) that incases the operative means (not shown), by which the speed indicating and recording mechanism is operated. The front wall 23, of the housing, is provided with a graduated dial 24, by which the speed is indicated, and is further provided with apertures 25 and 26, through which may be seen the distance recording figures and characters. The transparent closure 27 is spaced apart from the dial 24 by the projecting rim 28, on the dial. A cover 29, sliding over and in frictional engagement with the housing 21, serves to retain the dial 24 and closure 27 in position.

The main shaft 30 is rotatively mounted in the housing and projects from the threaded extension 22 to engage with the actuating means (not shown), the end 31, of the shaft being slotted for this purpose. The upper end of the shaft consists of a head 32, provided with upper ball bearing elements 33 and lower ball bearing elements 34, retained by the cap 35. The opposite end of the shaft is journaled in the extension 22. The weight element 36 is provided with a pivotal shaft 37, extending transversely in the main shaft 30 and rotatively journaled therein. A sliding sleeve 38 is mounted on shaft 30, and is connected by a link 39, with the weight element 36, and a spring 40, interposed between the sliding sleeve 38 and the shaft 37, serves to maintain the weight element 36 in an inclined position. When the main shaft 30 is inactive, the spring 40 serves to maintain the sleeve 38 in its lowermost position. As the shaft 30 is rotated, the centrifugal force created thereby tends to tilt the element 36 to a horizontal position in opposition to the tension of spring 40. In the auxiliary frame 41 disposed within the housing, is journaled a shaft 42, provided with the segmental rack member 43, and lever arm 44, carrying a roller 45. Roller 45 is in engagement with the sliding sleeve 38, and operated in the groove 46, formed by flanges 47 and 48. The arrangement is such that reciprocating movement of the sliding sleeve will cause an oscillating movement of the toothed segment 43. The indicator shaft 49, journaled in frame member 41, is provided with a pinion 50 in mesh with member 43, and on the opposite end is provided with a pointer 51, coöperating with dial 24 to indicate the speed when the vehicle is traveling or in motion.

In combination with the above-described means for visualizing the speed attained, I provide mechanism for recording the speed upon a paper fabric ribbon 52. The said speed recording mechanism consists of a reel or drum 53, containing a roll of the recording ribbon, 52, which has the free end thereof threaded in the slot 54, in the winding drum 55. The ribbon passes from the roll over the platen roller 56, faced with carbon-paper 57, and thence passed over roller 58, and thence to roller or winding 55. A rack 59, slidingly mounted on a transverse rod 60, extending between opposite sides of the housing, is in engagement with and operated by a pinion 61, on the shaft 49. One end of the rack 59 is enlarged to form a chamber 62, within which is mounted the recording stylus or plunger 63, which is held in operative engagement by spring 64, with the recording ribbon and in opposition to platen roller 56. The ribbon is printed with graduated lines to indicate the speed which the vehicle has traveled.

The main shaft 30 is adapted to rotate rapidly; being driven by rotative means (not shown) connected with a front vehicle wheel, and is provided with a worm-member 65, in mesh with a worm-gear 66, mounted on shaft 67. The worm 68, on shaft 67, drives a gear member 69, on shaft 70. The worm 71, on shaft 70, drives a gear-member 72, provided with a clutch member 73. A clutch member 74, adapted to engage with member 73, is rotatively mounted on a slidable shaft 75. The clutch member 74 is provided with a gear 76, which, in the engaged position, meshes with a gear member 77, rotatively mounted on a stub shaft 78, projecting from the vertical brace 79. The gear member 77 is provided with a projecting pin 80, adapted to engage with a corresponding hole 81, in winding drum 55. A plunger 82 is held in engagement with the grooved portion 83, on the slidable shaft 75, by a spring 84. On pushing the shaft 75 inward, the clutch member 74 is forced into engagement with clutch member 73 and into engagement with the gear member 77. The winding drum 55 is supported by gear member 77, and on the opposite end by a rotary and sliding plunger 85, which is maintained in engagement with the drum 55, by spring 86. Plunger 85 is provided with projections 87 and 88, which engage with the end of the winding drum. When the clutch member 74 is shifted to inoperative position, the gear member 77 is released, and the drum 55 may then be rotated by turning the member 85, allowing the remaining portion of the recording ribbon 52, which contains the record, to be wound upon the drum. The drum 55 may then be removed by first pulling the plunger 85 outward. That portion of the ribbon upon drum 55 may then be removed. The recorded portion is then torn from the unrecorded portion and the free end of the unrecorded portion is threaded in the slot 54, for additional speed records. The visual speed indicating means is operative independently of the receording means. The recording means is operative only when the clutch members 73 and 74 are in engaged position. The drawings, which are for illustrative purposes only, show that the winding drum makes approximately one revolution to a mile of travel of the vehicle, but this may be changed if desired so that the speed of rotation of member 77 shall be one-fourth as much as the speed of revolution of member 74, by changing the gear ratio. The speed record is visible through the aperture 89 in the dial plate 27, whereby the vehicle driver may see that the record is made upon the ribbon as it is fed forward by the rotation of the winding drum. The upper drum 53, on which is mounted the roll of recording ribbon, is provided with a slot 90, as shown in Fig. 3, in dotted lines; being similar to the securing groove 54 in drum 55. A plunger 91, actuated by a spring 92, interposed between the head of the plunger and the bottom of the plunger socket 93, serves to maintain a tension on the drum 53, so that the ribbon is kept taut as it passes over the platen roller 56. The drum 53 may be removed for inserting a new roll of the recording ribbon. The cover 29, transparent closure member 27, dial plate 23, and pointer 51, are all removable, for the purpose of renewing the roll of ribbon, or for detaching the recorded portion thereof.

The distance recording elements consist of rotary members 94, mounted on a shaft 95, and provided on one side with a gear 96, having twenty teeth, and on the opposite side, with an annular ring 97, having a groove 98, and two projecting teeth 99. The totalizing members 94 are inscribed on their periphery with numerals whereby the milage traveled by the vehicle is recorded and visibly displayed through the dial aperture 25. The members 94 are actuated by pinions 100 having six gear teeth, of which the teeth 101 are full width, and the teeth 102, alternately disposed, are of less width than the teeth 101. Members 94 are actuated as follows: During nine-tenths of a revolution, the annular ring 97 turns in the space opposite the short teeth 102, of pinions 100. During the remaining tenth of a revolution, the projecting teeth 99 actuate the pinion, which, being in constant mesh with gear 96, of the adjoining member 94, actuates the same for one-tenth of a revolution. The totalizing mechanism I have shown is similar to that employed in ordinary speedometers of which there are many in use.

The trip recording elements operate in a similar manner. The drum 103, provided with red numerals to record tenths of a mile, is driven by a sliding clutch member 104, provided on its periphery with clutch teeth 105, in constant engagement with internal clutch teeth on drum 103, and normally in engagement with similar internal clutch teeth on a gear member 106. Gear member 106 is provided with teeth 107, in engagement with gear teeth 108, on member 72. And is therefore constantly driven; the gear member making one revolution to a mile of vehicle travel.

Gear member 106 is provided with a peripheral flange 109, in engagement with the pinion 110, which actuates the first of the totalizer members 94. The member 106 is provided with teeth similar to projecting teeth 99, and operates the pinion in a similar manner.

The shaft 116 projects without the casing, and is provided with a fixed collar 111, and a fixed clutch member 112, disposed on opposite sides of the clutch member 104. A spring 113, interposed between the collar 111 and the end 114 of sleeve 115, serves to maintain the clutch member 104 normally in engagement with gear member 106. Shaft 116 is provided with a head 117, by which the shaft may be pulled longitudinally outward and rotated to reset the trip recording elements to zero position. Upon sliding the shaft outward, the clutch member 112 engages with the sliding clutch member 104, which is disengaged from the gear member 106. In this position, the shaft 110 may be rotated manually to reset the recording elements to zero position, as the member 104 is in engagement with the first recording drum 103.

With this arrangement I am enabled to place the distance recording elements on one side of the device, and the speed recording elements on the opposite side. It is believed that with the foregoing description, taken in connection with the drawings, the operation of the device will be readily understood without further explanation.

What is claimed is:

1. In a speedometer, the combination with a housing, of a vertically disposed rotary shaft mounted therein, distance recording means mounted therein, a train of gears whereby the rotary shaft actuates the distance recording means, centrifugally operated elements disposed on the rotary shaft, speed indicating elements actuated by the centrifugally operated elements, speed recording elements actuated by the movement of the speed indicating elements, speed recording elements actuated by the movement of the distance recording means, and clutch means to engage and disengage the last-named speed recording elements, said last-named speed recording elements coöperating with the first-named speed recording elements in the clutch engaging position.

2. In a speedometer, the combination with a housing, of distance recording mechanism mounted therein, a central and vertically disposed shaft mounted in the housing and driven by outward means, a train of gearing whereby the rotary and vertically disposed shaft drives the distance recording mechanism, and speed indicating mechanism consisting of a graduated dial forming the front wall of the housing, a vertical brace disposed in the housing, a standard at the rear of the vertical brace, an indicator shaft journaled in the brace and standard, a pointer mounted on the indicator shaft and coöperating with the dial, a centrifugally actuated weight, a shaft therefor journaled in the vertical main shaft, a sleeve sliding on the vertical shaft, a link connecting the sleeve and the weight element, a spring interposed between the pivotal weight shaft and the sliding sleeve, flanges on the sleeve forming an annular groove, a countershaft journaled in the standard, a toothed segmental rack member mounted on the shaft, a pinion on the indicator shaft and in engagement with the segmental rack member, a lever on the opposite end of the countershaft, and a roller carried by the lever and in engagement with the annular groove on the sliding sleeve.

3. In a speedometer, the combination with a housing, of a central and vertically disposed shaft mounted therein and driven by external driving means, a combination clutch and gear member journaled in the housing, a train of gearing whereby the clutch member is driven by the movement of the vertical shaft, a centrifugally actuated weight element mounted on the vertical shaft, a sleeve sliding on the vertical shaft, a link connecting the rim of the weight element and the sleeve, a washer on the vertical shaft, a spring interposed between the washer and the sleeve, flanges on the sleeve forming an annular groove, a dial forming the front wall of the housing, a vertical brace disposed in the housing, a standard therein and at the rear of the vertical brace, a countershaft journaled in the standard, a segmental rack fixed to the countershaft, an indicator shaft journaled in the vertical brace and standard and centrally and longitudinally disposed within the housing, a pointer on the indicator shaft coöperating with the dial to visually indicate the speed, a lever on the opposite end of the countershaft, a roller carried by the lever and in engagement with the annular groove on the sliding sleeve, a rod fixed within the housing and extending horizontally and transversely therein, a rack member sliding on the horizontal guide rod, a gear-wheel on the indicator shaft and in engagement with the horizontal rack member, a chamber in the rack member, a stylus mounted in the chamber, a spring within the chamber to actuate the stylus, an indicating ribbon, a revoluble platen roller mounted in opposed relation to the stylus, and means for passing the ribbon over the platen roller in accordance with the speed of the speed indicating means.

In testimony whereof I hereunto affix my signature this 19th day of May, 1920.

KUZO YOSHINAGA.